United States Patent
Arikawa et al.

(10) Patent No.: US 6,763,602 B2
(45) Date of Patent: Jul. 20, 2004

(54) METHOD FOR MEASURING FREE-STATE DIAMETER OF METAL RING

(75) Inventors: Mamoru Arikawa, Wako (JP); Shigeru Kanehara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/273,354

(22) Filed: Oct. 18, 2002

(65) Prior Publication Data

US 2003/0084583 A1 May 8, 2003

(30) Foreign Application Priority Data

Oct. 19, 2001 (JP) ........................................ 2001-321638

(51) Int. Cl.[7] ............................................... G01B 21/10
(52) U.S. Cl. ........................................ 33/701; 33/555.1
(58) Field of Search .......................... 33/542, 543, 550, 33/555.1, 701

(56) References Cited

U.S. PATENT DOCUMENTS

| | | | | |
|---|---|---|---|---|
| 2,671,272 A | * | 3/1954 | Bishop | ...................... 33/555.1 |
| 2,863,223 A | * | 12/1958 | Reicherter | .................. 33/555.1 |
| 4,922,622 A | * | 5/1990 | Galloway | ..................... 33/542 |
| 4,928,392 A | * | 5/1990 | Donaldson | .................. 33/555.1 |
| 5,471,757 A | * | 12/1995 | McDonald | ..................... 33/542 |
| 6,079,113 A | * | 6/2000 | Helmrichs | .................. 33/555.1 |

FOREIGN PATENT DOCUMENTS

| | | |
|---|---|---|
| JP | 63-203945 | 8/1988 |
| JP | 7-110390 | 11/1995 |

* cited by examiner

*Primary Examiner*—G. Bradley Bennett
(74) *Attorney, Agent, or Firm*—Armstrong, Kratz, Quintos, Hanson & Brooks, LLP

(57) ABSTRACT

A free-state diameter (a diameter in a state in which a residual stress has been released by cutting) of each of metal rings in a continuously variable transmission) is determined so that a predetermined compression stress and a predetermined tensile stress are applied to outer and inner surfaces of the metal ring in an endless state in which the metal ring is not cut, respectively. When the metal ring is cut in order to measure the free-state diameter, the metal ring is cut at least at two points so that cut ends do not interfere with each other in the free state, and the free-state diameter is then measured. Thus, the free-state diameter of the metal ring in a continuously variable transmission can be accurately measure.

1 Claim, 10 Drawing Sheets

ENDLESS STATE

FREE STATE
(CUT AT ONE POINT)

FREE STATE
(CUT AT TWO POINT)

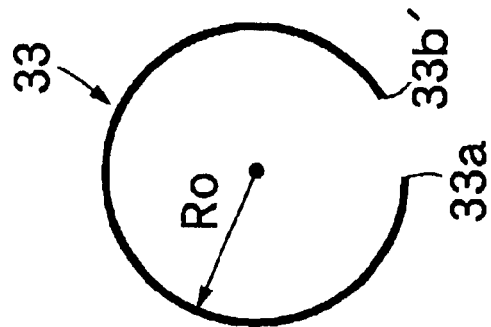
FIG.10A ENDLESS STATE
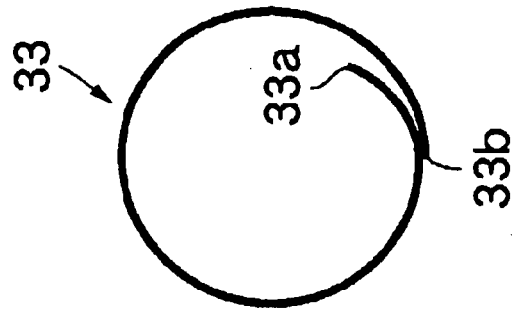
FIG.10B FREE STATE (CUT AT ONE POINT)
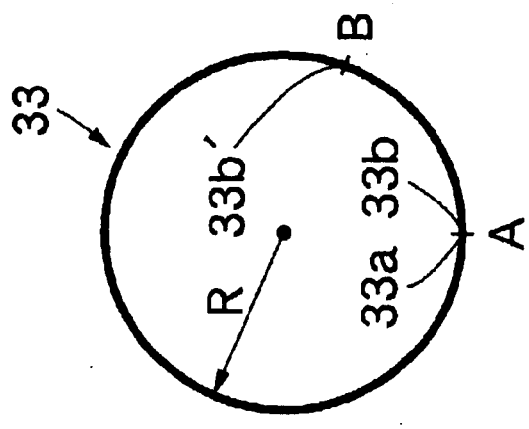
FIG.10C FREE STATE (CUT AT TWO POINT)

METHOD FOR MEASURING FREE-STATE DIAMETER OF METAL RING

BACKGROUND OF THE INVENTION

1. Field of the Invention

The present invention relates to a method for measuring a free-state diameter of a metal ring of a metal belt for a continuously variable transmission by cutting the metal ring.

2. Description of the Related Art

A metal belt used in a continuously variable transmission typically includes a plurality of metal elements mounted on metal ring assemblies, each metal ring assembly having a plurality of metal rings laminated on one another. Accordingly, a driving force is transmitted by a pushing force between the metal elements, which are in contact with one another, in a state in which the metal belt has been reeved around a driving pulley and a driven pulley. A stress applied to each of the metal rings supporting the metal elements in the metal belt is varied periodically during traveling of the metal belt along the driving pulley and the driven pulley. Moreover, the applied stress is different between an inner peripheral surface and an outer peripheral surface of the metal ring. If the stress applied to the inner peripheral surface of the metal ring and the stress applied to the outer peripheral surface are not uniform, a face of the metal ring which receives a large stress fatigues early, which causes a reduction in the overall fatigue life of the overall metal ring assembly.

Conventional metal belts are disclosed in Japanese Patent Application Laid-open No. 63-20945 and Japanese Patent Publication No. 7-110390, wherein a residual stress is pre-applied to each metal ring so the stresses applied to the inner and outer peripheral surfaces of the metal ring are as uniform as possible. Thus, any stress generated by the operation of a continuously variable transmission is countervailed by the residual stress and the fatigue life of the metal ring is prolonged.

In the conventionally known metal belt, in order to verify whether the magnitude of the residual stress applied to the metal ring is equal to a preset value, the metal ring is cut at one point to provide a state (a free state) in which a sum of moments generated by the residual stress is zero, and the diameter of the metal ring in the free state is measured. If the residual stress applied to the metal ring is a tensile stress on the outer peripheral surface and a compression stress on the inner peripheral surface, cut ends formed upon cutting of the metal ring are moved away from each other, and the diameter in the free state is larger than that in the endless state (a non-cut state). However, if the residual stress applied to the metal ring is a compression stress on the outer peripheral surface and a tensile stress on the inner peripheral surface, cut ends formed upon cutting of the metal ring are moved toward each other to interfere with each other as shown in FIG. 10B, and for this reason, the free-state diameter 2Ro (see FIG. 10G) cannot be measured accurately.

SUMMARY OF THE INVENTION

Accordingly, it is an object of the present invention to ensure that the free-state diameter of each of the metal rings of the continuously variable transmission can be measured accurately.

To achieve the above object, according to a feature of the present invention, there is provided a method for measuring a free-state diameter of each of metal rings of a metal belt for a continuously variable transmission by cutting the metal ring, the free-state diameter of the metal ring being determined so that a predetermined compression stress and a predetermined tensile stress are applied to an outer peripheral surface and an inner peripheral surface of the metal ring in an endless state, respectively, wherein the metal ring is cut at least at two points so that cut ends formed upon cutting of the metal ring do not interfere with each other in a free state, and a free-state diameter is measured.

With the above configuration, the free-state diameter of the metal ring being determined so that the predetermined compression stress and the predetermined tensile stress are respectively applied to the outer peripheral surface and the inner peripheral surface of the metal ring in the endless state. Therefore, if the metal ring is cut at one point in order to measure the free-state diameter, the cut ends interfere with each other, but the interference can be avoided by cutting the metal ring at two points to measure the free-state diameter, whereby accurate measurement can be achieved.

The above and other objects, features and advantages of the invention will become apparent from the following description of the preferred embodiment taken in conjunction with the accompanying drawings.

BRIEF DESCRIPTION OF THE DRAWINGS

FIGS. 10A, 10B and 10C are diagrams for explaining a technique for measuring the free-state diameter 2Ro of the metal ring.

DESCRIPTION OF THE PREFERRED EMBODIMENT

The present invention will now be described by way of an embodiment with reference to the accompanying drawings.

Figure 1:
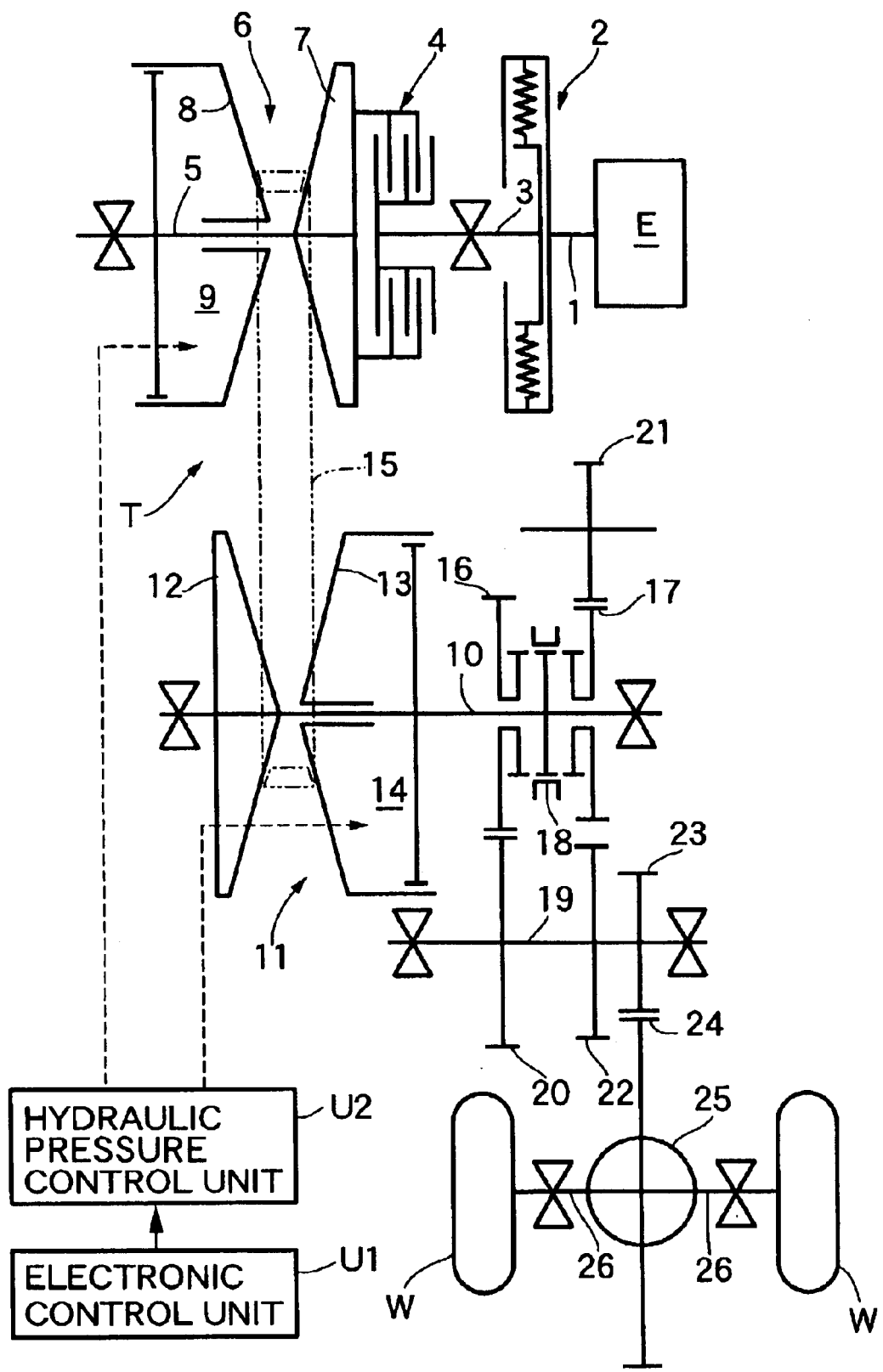
FIG. 1 is a skeleton diagram of a power-transmitting system of a vehicle having a belt-type continuously variable transmission mounted thereon.

FIG. 1 shows an outline structure of a metal belt-type continuously variable transmission T mounted on an automobile. An input shaft 3 connected to a crankshaft 1 of an engine E through a damper 2 is connected to a driving shaft 5 of the metal belt-type continuously variable transmission T through a starting clutch 4. A driving pulley 6 mounted on the driving shaft 5 includes a stationary pulley half 7 secured to the driving shaft 5, and a movable pulley half 8 capable of being moved toward and away from the stationary pulley half 7. The movable pulley half 8 is biased toward the stationary pulley half 7 by a hydraulic pressure applied to an oil chamber 9.

Figure 2:
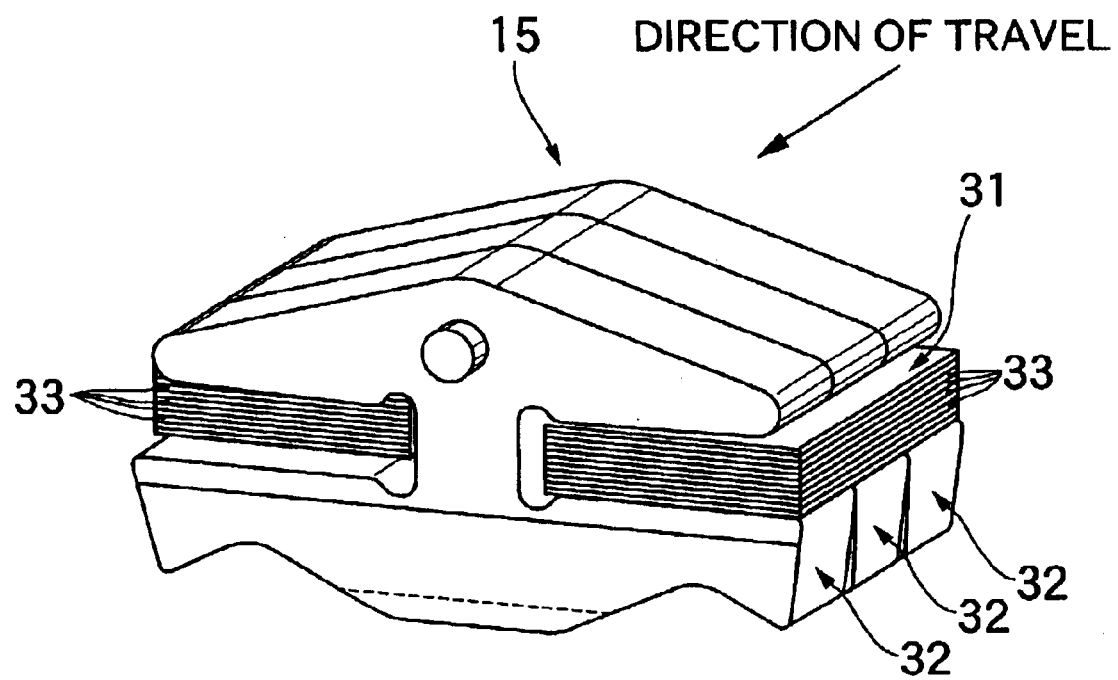
FIG. 2 is a perspective view of a portion of a metal belt.

A driven shaft 11 mounted on a driven shaft 10 disposed in parallel to the driving shaft 5 includes a stationary pulley half 12 secured to the driven shaft 10, and a movable pulley half 13 capable of being moved toward and away from the stationary pulley half 12. The movable pulley half 13 is biased toward the stationary pulley half 12 by a hydraulic pressure applied to an oil chamber 14. A metal belt 15 comprising a large number of metal elements 32 supported on a pair of left and right metal ring assemblies 31, 31 is reeved between the driving pulley 6 and the driven pulley 11 (see FIG. 2). Each of the metal ring assemblies 31, 31 comprises 12 metal rings 33 laminated on one another.

A forward driving gear 16 and a backward driving gear 17 are relatively rotatably carried on the driven shaft 10 and capable of being selectively coupled to the driven shaft 10 by a selector 18. A forward driven gear 20 meshed with the forward driving gear 16 and a backward driven gear 22 meshed with the backward driving gear 17 through a backward idling gear 21 are secured to an output shaft 19 disposed in parallel to the driven shaft 10.

The rotation of the output shaft 19 is input to a differential gear 25 through a final driving gear 23 and a final driven gear 24 and transmitted therefrom through left and right axles 26, 26 to driven wheels W, W.

Thus, a driving force of the engine E is transmitted to the driven shaft 10 through the crankshaft 1, the damper 2, the input shaft 3, the starting clutch 4, the driving shaft 5, the driving pulley 6, the metal belt 15 and the driven pulley 11. When a forward traveling range is selected, a driving force of the driven shaft 10 is transmitted to the output shaft 19 through the forward driving gear 16 and the forward driven gear 20 to allow a vehicle to travel forwards. When a backward traveling range is selected, a driving force of the driven shaft 10 is transmitted to the output shaft 19 through the backward driving gear 17, the backward idling gear 21 and the backward driven gear 22 to allow the vehicle to travel backwards.

At this time, hydraulic pressures applied to the oil chamber 9 in the driving pulley 6 and the oil chamber 14 in the driven pulley 11 in the metal belt-type continuously variable transmission T are controlled by a hydraulic pressure control unit U2 operated by a command from an electronic control unit U1, whereby the ratio of the continuously variable transmission T is regulated continuously or in a stepless manner. More specifically, if the hydraulic pressure applied to the oil chamber 14 in the driven pulley 11 is increased relative to the hydraulic pressure applied to the oil chamber 9 in the driving pulley 6, the groove width of the driven pulley 11 is decreased, leading to an increase in effective radius, and in accordance with this, the groove width of the driving pulley 6 is increased, leading to a decrease in effective radius. Therefore, the ratio of the metal belt-type continuously variable transmission T is changed continuously toward LOW (a state of a largest ratio). On the other hand, if the hydraulic pressure applied to the oil chamber 9 in the driving pulley 6 is increased relative to the hydraulic pressure applied to the oil chamber 14 in the driven pulley 11, the groove width of the driving pulley 6 is decreased, leading to an increase in effective radius, and in accordance with this, the groove width of the driven pulley 11 is increased, leading to a decrease in effective radius. Therefore, the ratio of the metal belt-type continuously variable transmission T is changed continuously toward OD (a state of a smallest ratio).

Figure 3:
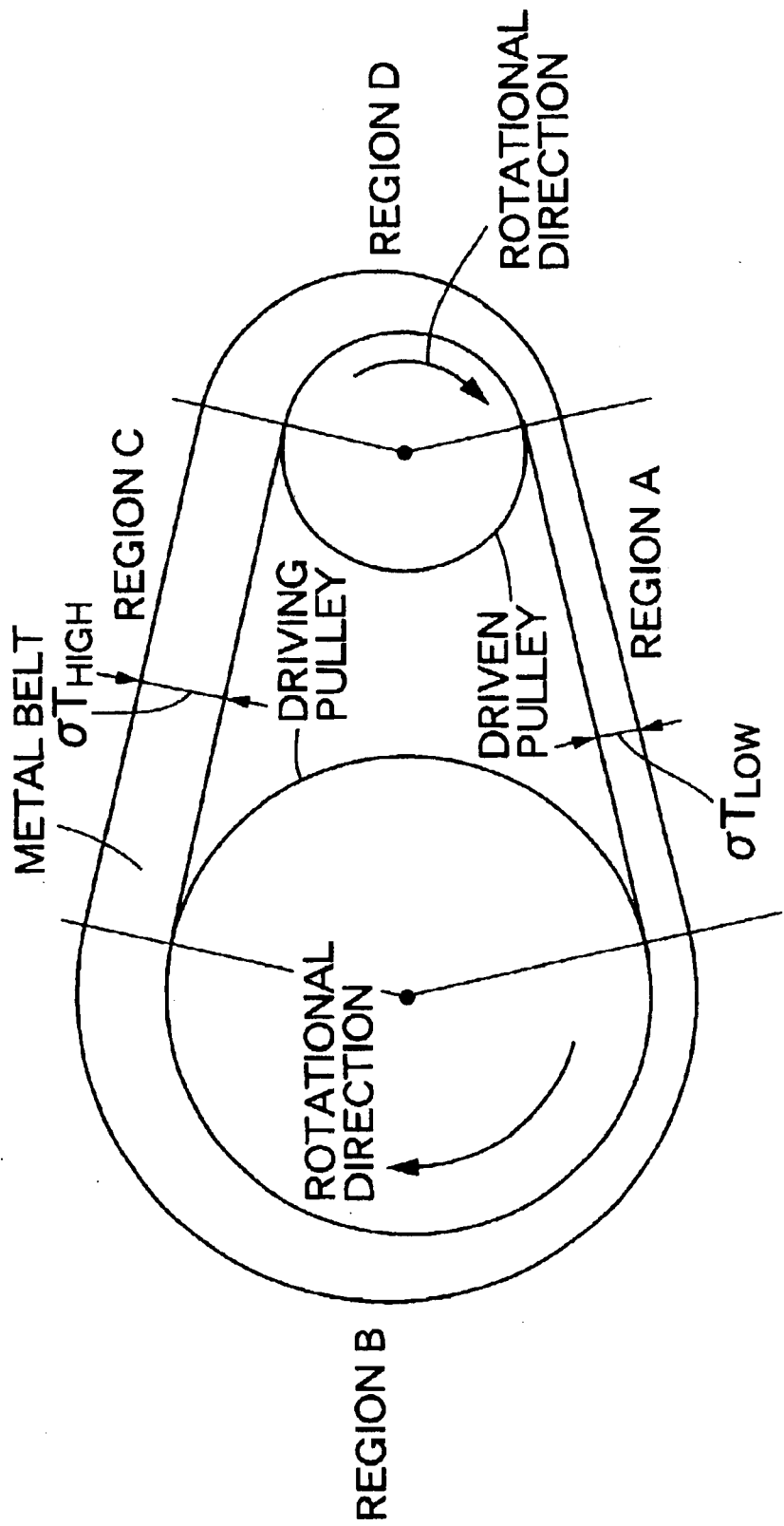
FIG. 3 is a diagram for explaining a tensile stress applied to a metal ring.

FIG. 3 shows a state in which the vehicle is in a state of travel at a highest speed (a state of a TOP ratio), wherein the effective radius of the driving pulley 6 is larger than that of the driven pulley 11. The thickness of the metal belt 15 in FIG. 3 diagrammatically represents the magnitude of a tensile stress on each of the metal rings 33 due to the tension of the metal belt 15. As shown by dashed lines in FIGS. 4 and 5, in a return-side chord section (a region A) where the metal belt 15 is returned from the driven pulley 11 to the driving pulley 6, the tensile stress is a constant value $\sigma T_{LOW}$, and an advance-side chord section (a region C) where the metal belt 15 is delivered from the driving pulley 6 to the driven pulley 11, the tensile stress is a constant value $\sigma T_{HIGH}$. The stress $\sigma T_{LOW}$ in the region A is smaller than the stress $\sigma T_{HIGH}$ in the region C. In a section (a region B) where the metal belt 15 is wound onto the driving pulley 6, the stress from an entrance side to an exit side is increased from $\sigma T_{LOW}$ to $\sigma T_{HIGH}$, and in a section (a region D) where the metal belt 15 is wound onto the driven pulley 11, the stress from an entrance side to an exist side is decreased from $\sigma T_{HIGH}$ to $\sigma T_{LOW}$.

The tensile stress on the metal ring 33 based on the tension of the metal belt 15 is constant in a widthwise direction of the metal ring 33. More specifically, as shown by the dashed lines in FIGS. 4 and 5, the tensile stresses on an inner peripheral surface and an outer peripheral surface of the metal ring 33 are equal to each other.

Figure 6:
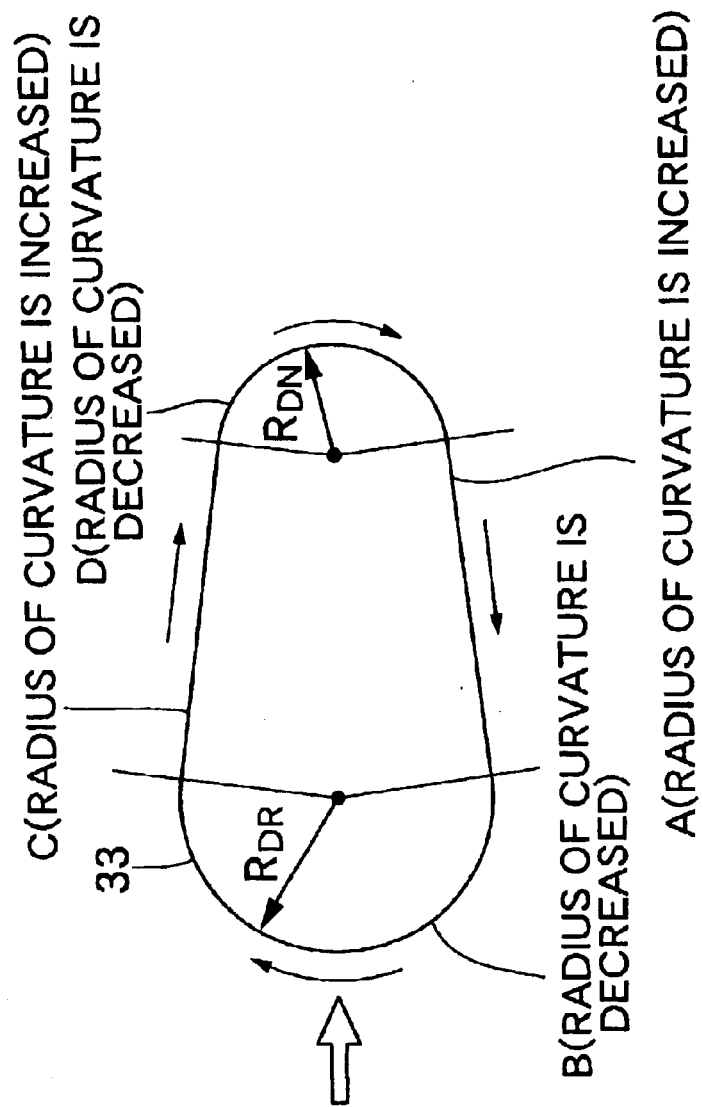
FIGS. 6A and 6B are diagrams showing shapes of the metal ring in a non-service state (an endless state) and a service state.

In addition to the tensile stress based on the tension, a tensile stress and a compression stress based on the bending of the metal ring 33 are applied to the metal ring 33. As shown in FIG. 6A, the metal ring 33 in a non-service state in which no external force is applied is circular, but as shown in FIG. 6B, the metal ring in a service state is deformed into a shape having the regions A to D. In the return-side chord section (the region A) and the advance-side section (the region C), the radius of curvature assuming R in the non-service state is increased infinitely (∞) In the region B where the metal belt 15 is wound onto the larger-diameter driving pulley 6, the radius of curvature assuming R in the non-service state is decreased to $R_{DR}$, and in the region D where the metal belt 15 is wound onto the smaller-diameter driven pulley 11, the radius of curvature assuming R in the non-service state is decreased to $R_{DN}$.

In this way, in the regions A and C where the radius of curvature of the metal ring 33 is increased, a tensile bending stress $\sigma V_{ST}$ is applied to the inner peripheral surface of the metal ring 33, and a compression bending stress $\sigma V_{ST}$ is applied to the outer peripheral surface. On the other hand, in the regions B and D where the radius of curvature of the metal ring 33 is decreased, a tensile bending stress $\sigma V_{DR}$, $\sigma V_{DN}$ is applied to the inner peripheral surface of the metal ring 33, and a compression bending stress $\sigma V_{DR}$, $\sigma V_{DN}$ is applied to the outer peripheral surface.

Figure 4:
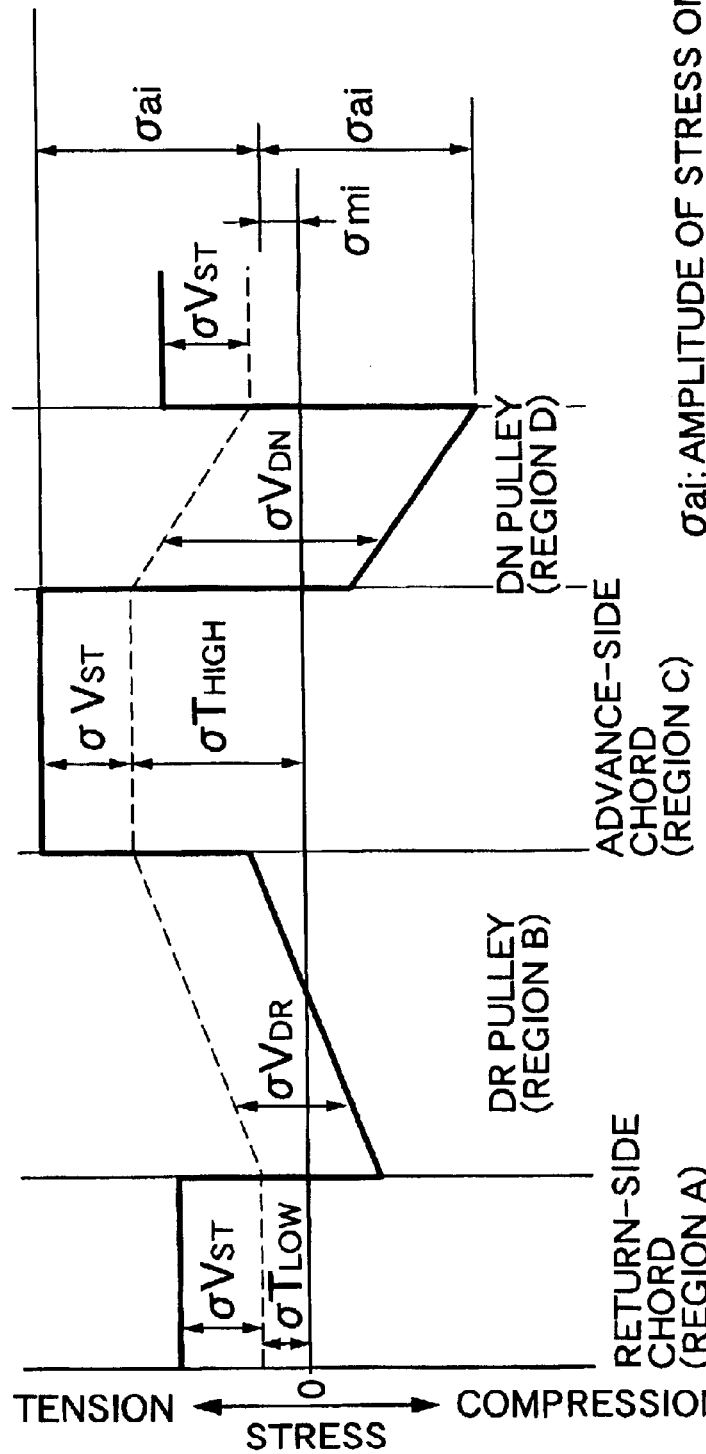
FIG. 4 is a graph showing a variation in stress applied to an inner peripheral surface of the metal ring.
Figure 5:
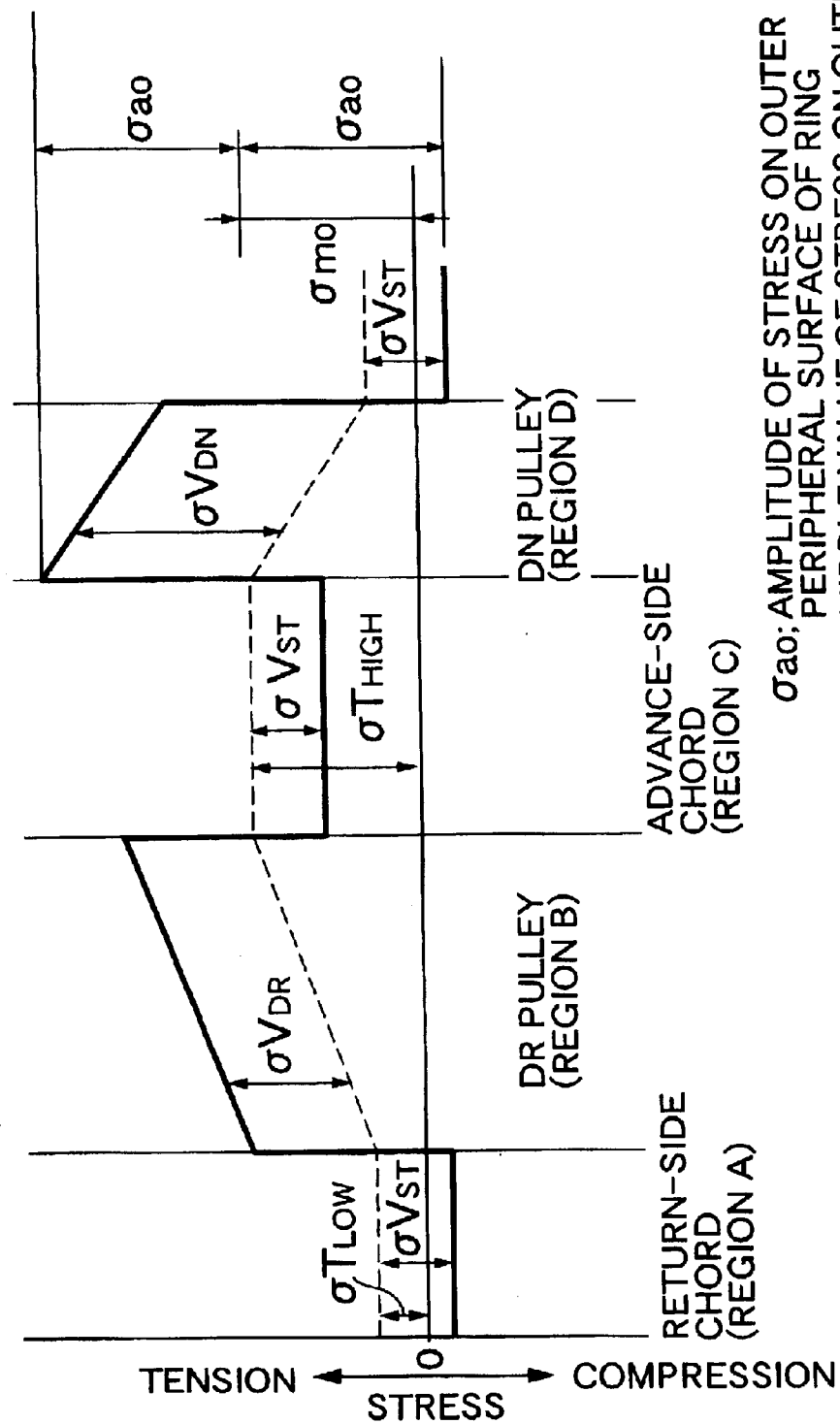
FIG. 5 is a graph showing a variation in stress applied to an outer peripheral surface of the metal ring.

Also shown in graphs in FIGS. 4 and 5 are variations in bending stresses applied to the inner peripheral surface and the outer peripheral surface of the metal ring 33, when the vehicle is in the highest-speed travel state described in FIG. 3. As shown in FIG. 4, a constant tensile bending stress $\sigma V_{ST}$ is applied to the inner peripheral surface of the metal ring 33 in the two chord sections (the regions A and C). In the region B where the metal belt 15 is wound onto the driving pulley having the larger radius of curvature, a relatively small compression bending stress $\sigma V_{DR}$ is applied to the inner peripheral surface of the metal ring 33, and in the region D where the metal belt 15 is wound onto the driven pulley having the smaller radius of curvature, a relatively large compression bending stress $\sigma V_{DN}$ is applied to the inner peripheral surface of the metal ring 33. On the other hand, as shown in FIG. 5, a constant compression bending stress $\sigma V_{ST}$ is applied to the outer peripheral surface of the metal ring 33 in the two chord sections (the regions A and C). In the region B where the metal belt 15 is wound onto the driving pulley having the larger radius of curvature, a relatively small tensile bending stress $\sigma V_{DR}$ is applied to the outer peripheral surface of the metal ring 33, and in the region D where the metal belt 15 is wound onto the driven pulley having the smaller radius of curvature, a relatively large tensile bending stress $\sigma V_{DN}$ is applied to the outer peripheral surface of the metal ring 33.

At this time, by previously applying a residual stress in an opposite direction to the inner peripheral surface and the outer peripheral surface of the metal ring 33, the bending stresses $\sigma V_{ST}$, $\sigma V_{DR}$ and $\sigma_{DN}$ generated on the inner peripheral surface and the outer peripheral surface of the metal ring 33 can be increased or decreased by the residual stress, whereby the variations in bending stresses shown in the graphs in FIGS. 4 and 5 can be regulated. Any of means such as a shot pinning, a rolling, a thermal treatment and the like may be used as a means for applying the compression residual stress to the metal ring 33.

A solid line in FIG. 4 indicates a variation in total stress which results from the addition of the stresses $\sigma TL_{OW}$ and $\sigma T_{HIGH}$ applied based on the tension of the metal ring 33 and the stresses $\sigma V_{DR}$ and $\sigma_{DN}$ applied to the inner peripheral surface of the metal ring 33 based on the bending of the metal ring 33 and which is applied to the inner peripheral surface of the metal ring 33. A solid line in FIG. 5 indicates a variation in total stress which results from the addition of the stresses $\sigma TL_{OW}$ and $\sigma T_{HIGH}$ applied based on the tension of the metal ring 33 and the stresses $\sigma V_{DR}$ and $\sigma_{DN}$ applied to the outer peripheral surface of the metal ring 33 based on the bending of the metal ring 33 and which is applied to the outer peripheral surface of the metal ring 33.

In FIG. 4, the amplitude $\sigma ai$ of the stress on the inner peripheral surface of the metal ring 33 is defined as one half of a difference between the largest tensile stress and the largest compression stress, and a middle value $\sigma ai$ of the stress on the inner peripheral surface of the metal ring 33 is defined by a stress at the center of the amplitude $\sigma ai$ of the stress. Likewise, in FIG. 5, the amplitude $\sigma ao$ of the stress on the outer peripheral surface of the metal ring 33 is defined as one half of a difference between the largest tensile stress and the largest compression stress, and a middle value $\sigma ao$ of the stress on the outer peripheral surface of the metal ring 33 is defined by a stress at the center of the amplitude $\sigma ao$ of the stress.

Figure 7:
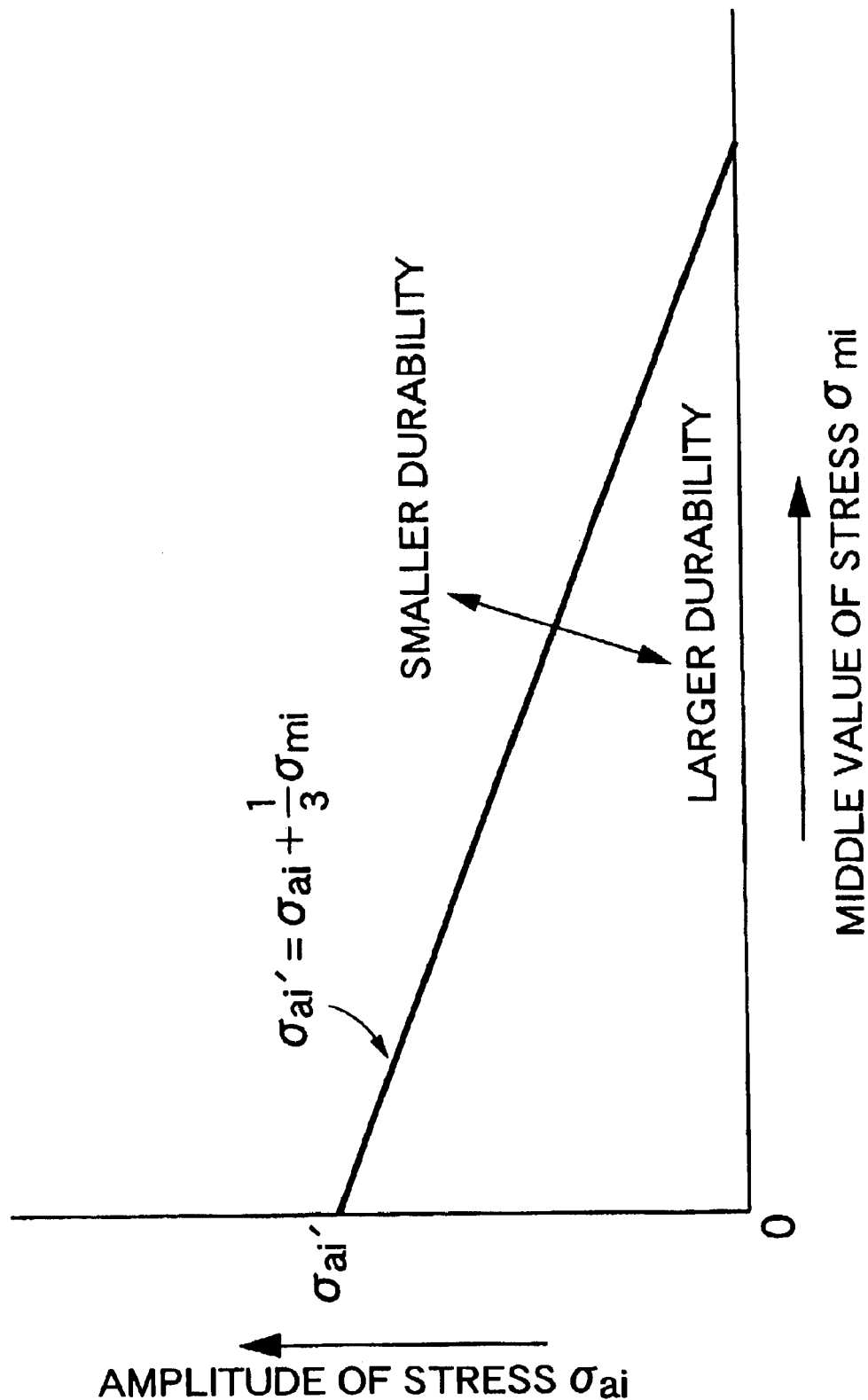
FIG. 7 is a graph for determining corrected stress amplitudes σai' and σao'.

FIG. 7 is a graph made by taking the middle value $\sigma mi$ of the stress on the inner peripheral surface of the ring on the axis of abscissas and taking the amplitude $\sigma ai$ of the stress on the inner peripheral surface of the ring on the axis of ordinates, wherein a rightward declined line indicates a combination of the middle value $\sigma mi$ of the stress and the amplitude $\sigma ai$ of the stress, in which the fatigue lives of the metal ring 33 are equalized to each other. When the middle value $\sigma mi$ of the stress is zero, the amplitude $\sigma ai$ of the stress is largest, and the amplitude $\sigma ai$ of the stress at that time is defined as a corrected stress amplitude $\sigma ai'$. Namely, the corrected stress amplitude $\sigma ai'$ is provided according to $$\sigma ai' = \sigma ai + (\tfrac{1}{3})\sigma mi$$

using the stress amplitude $\sigma ai$ and the middle value $\sigma mi$ of the stress. Likewise, a corrected amplitude $\sigma ao'$ of the stress on the outer peripheral surface of the ring is provided according to $$\sigma ao' = \sigma ao + (\tfrac{1}{3})\sigma mo$$

using the stress amplitude $\sigma ao$ and the middle value $\sigma mo$ of the stress.

The corrected stress amplitudes $\sigma ai'$ and $\sigma ao'$ calculated as functions of the stress amplitudes $\sigma ai$ and $\sigma ao$ and the middle stress values $\sigma mi$ and $\sigma mo$ are appropriate parameters representing the fatigue lives of the inner peripheral surface and the outer peripheral surface of the metal ring 33.

Figure 8:
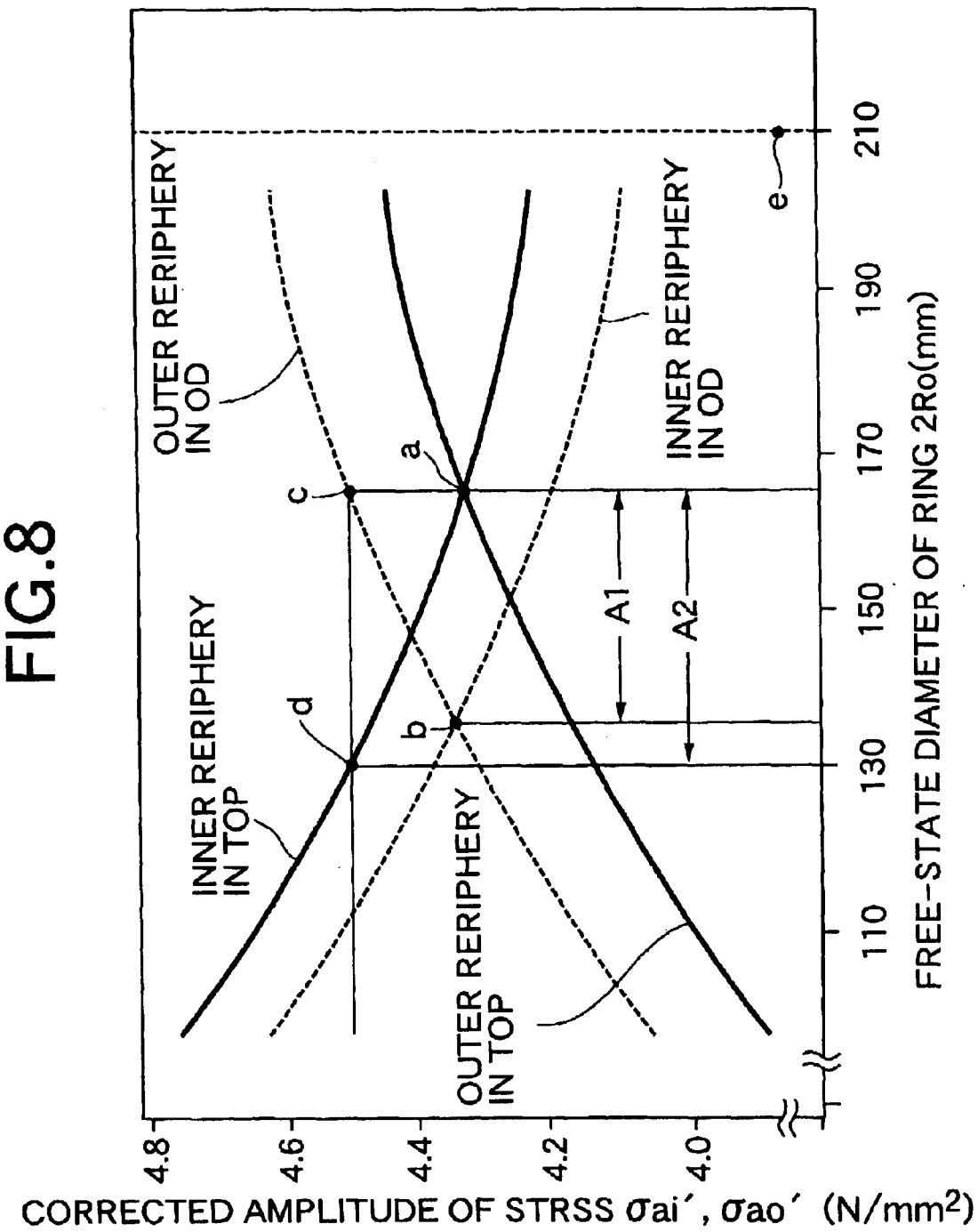
FIG. 8 is a graph for determining a free-state diameter 2Ro of the metal ring from the corrected stress amplitudes σai' and σao'.

A graph in FIG. 8 shows characteristics of variations in the corrected stress amplitudes $\sigma ai'$ and $\sigma ao'$ in the TOP state (the state of travel at the highest speed) and in the OD state (the state in which the ratio is smallest), when the diameter 2Ro of the metal ring 33 in a free state has been changed in the metal belt-type continuously variable transmission T in which the axis—axis distance is 155 mm and the inside diameter of the metal ring 33 in an endless state (a non-cut state) is 210 mm. Here, the free state of the metal ring 33 is defined as a state in which a portion of the metal ring has been cut to release the residual stress.

In the TOP state which is a severest operational condition for the metal ring 33, when the free-state diameter 2Ro of the metal ring 33 is set at 165 mm, the corrected amplitude $\sigma ai'$ of the stress on the inner peripheral surface and the corrected amplitude $\sigma ao'$ of the stress on the outer peripheral surface are equal to each other (see a point a in FIG. 8), and hence, the fatigue life of the inner peripheral surface and the fatigue life of the outer peripheral surface of the metal ring 33 can be made equal to each other, whereby the fatigue life of the entire metal ring 33 can be prolonged.

If the free-state diameter 2Ro of the metal ring 33 is greater than 165 mm, the corrected amplitude $\sigma ao'$ of the stress on the outer peripheral surface is greater than the corrected amplitude $\sigma ai'$ of the stress on the inner peripheral surface. If a difference between the corrected amplitude $\sigma ao'$ and the corrected amplitude $\sigma ai'$ is further increased, the corrected amplitude $\sigma ao'$ of the stress on the outer peripheral surface of the metal ring 33 is increased and as a result, there is a possibility that the breaking of the metal ring 33 is started from the outer peripheral surface. On the other hand, if the free-state diameter 2Ro of the metal ring 33 is less than 165 mm, the corrected amplitude $\sigma ai'$ of the stress on the inner peripheral surface is greater than the corrected amplitude $\sigma ao'$ of the stress on the outer peripheral surface. If a difference between the corrected amplitude $\sigma ao'$ and the corrected amplitude $\sigma ai'$ is further increased, the corrected amplitude $\sigma ao'$ of the stress on the inner peripheral surface of the metal ring 33 is increased and as a result, there is a possibility that the breaking of the metal ring 33 is initiated from the inner peripheral surface.

In the OD state in which the service frequency is greater than that in the TOP state, when the free-state diameter 2Ro of the metal ring 33 is set at 135 mm, the corrected amplitude $\sigma ai'$ of the stress on the inner peripheral surface and the corrected amplitude $\sigma ao'$ of the stress on the outer peripheral surface are equal to each other (see a point b in FIG. 8), and hence, the fatigue life of the inner peripheral surface and the fatigue life of the outer peripheral surface of the metal ring 33 can be equalized to each other, whereby the fatigue life of the entire metal ring 33 can be prolonged.

From the forgoing, it is optimal that the free-state diameter 2Ro of the metal ring 33 is set at 165 mm in correspondence to the OD state which is the severest operational state, and it is appropriate that the free-state diameter 2Ro of the metal ring 33 is set at a value in a range of 135 mm to 165 mm (see a region A1 in FIG. 8) in correspondence to the OD state which is the severest operational state and the OD state which is an operational state in which the service frequency is highest.

If the free-state diameter 2Ro of the metal ring 33 is set at 165 mm which is an optimal value in the TOP state, the corrected amplitude σao' (see a point c in FIG. 8) of the stress on the outer peripheral surface of the metal ring 33 in the OD state is 4.5 N/mm$^2$, and the free-state diameter 2Ro at which the corrected amplitude σai' of the stress on the inner peripheral surface, which is equal to the corrected amplitude σao', is generated in the TOP state, is 130 mm (see a point d in FIG. 8). Therefore, if the free-state diameter 2Ro of the metal ring 33 is set at a value in a range of 130 mm to 165 mm (see a region A2 in FIG. 8), the corrected stress amplitudes σai' and σao can be suppressed to 4.5 N/mm$^2$ or less in all the operational states.

As described above, the appropriate range of the free-state diameter 2Ro is smaller than 210 mm (a line at a point e in FIG. 8) which is the inside diameter of the metal ring 33 in the endless state (the non-cut state) as shown in FIG. 8.

Figure 9:
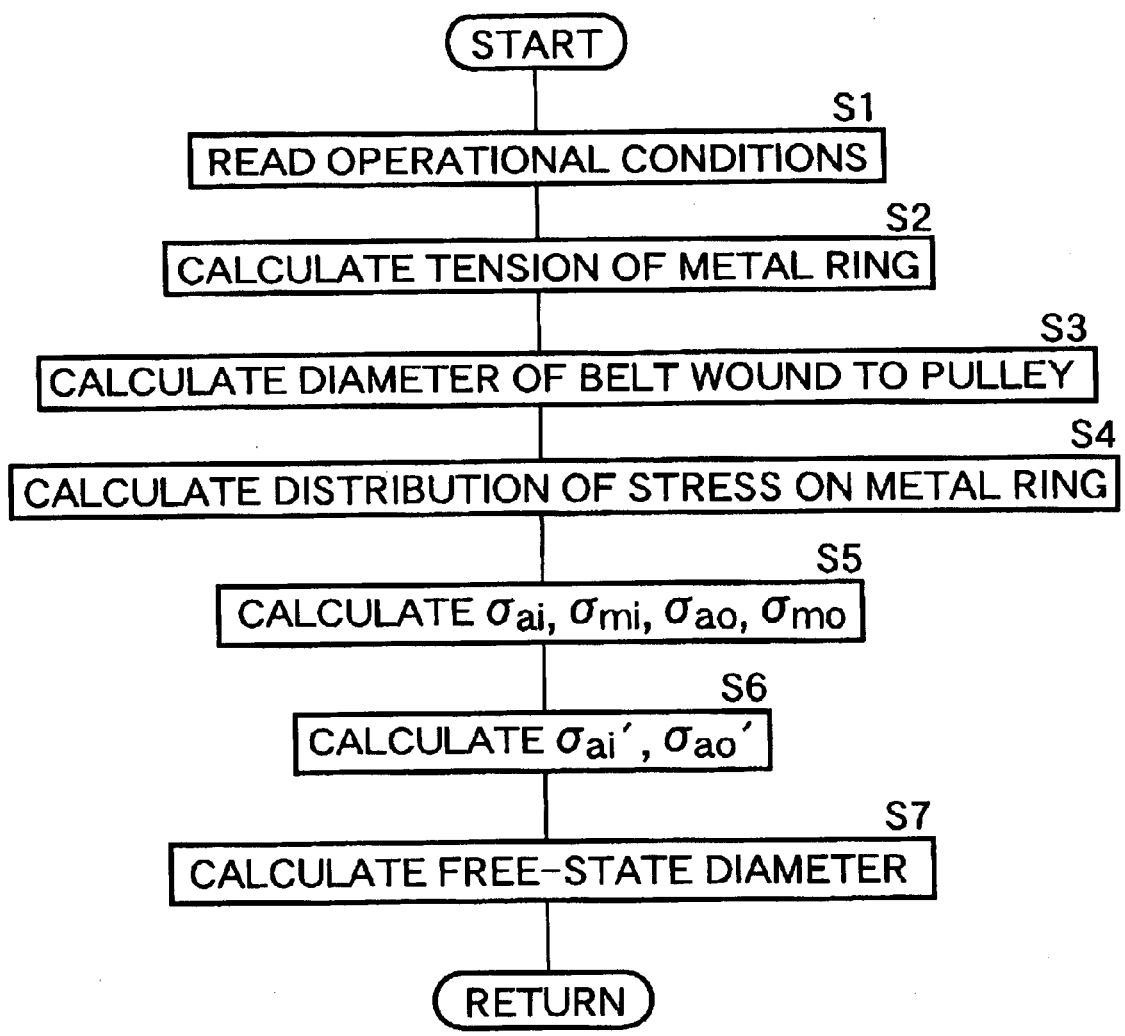
FIG. 9 is a flow chart for explaining steps for determining the free-state diameter 2Ro of the metal ring.

A technique for setting the above-described free-state diameter 2Ro of the metal ring 33 will be described again with reference to a flow chart shown in FIG. 9.

First, operational conditions for the metal belt-type continuously variable transmission T, i.e., the ratio, the input torque, the input rotational speed and the like are read at Step S1. At step S2, a tension (see the dashed lines in FIGS. 4 and 5) of the metal ring 33 is calculated from a power-transmitting characteristic of the metal belt-type continuously variable transmission T, and at Step S3, diameters of metal ring 33 wound to the driving pulley 6 and the driven pulley 11 are calculated. At subsequent Step S4, distributions of stresses on the inner peripheral surface and the outer peripheral surface of the metal ring are calculated (see the solid lines FIGS. 4 and 5) by adding a compression stress and a tensile stress calculated from the diameters of metal ring 33 wound to a tensile stress based on the tension of the metal ring.

Subsequently, at Step S5, an amplitudes σai and a middle value σmi of a stress on the inner peripheral surface of the metal ring 33 and an amplitudes σao and a middle value σmo of a stress on the outer peripheral surface of the metal ring 33 are calculated from the graphs shown in FIGS. 4 and 5. Then, a corrected amplitude σai' of the stress on the inner peripheral surface and a corrected amplitude σao' (see FIG. 8) of the stress on the outer peripheral surface are calculated from the values σai, σmi, σao and σmo at Step S6. A free-state diameter 2Ro of the metal ring 33 is calculated at Step S7, based on the corrected stress amplitudes σai' and σao' from the graph shown in FIG. 8.

Now, when the optimal free-state diameter 2Ro of the metal ring 33, at which the fatigue life of the metal ring 33 can be prolonged, has been determined in the above manner, a residual stress permitting such free-state diameter 2Ro to be provided is applied to the metal ring 33 which is in the endless state. To confirm whether the residual stress equal to a preset value has been applied to the metal ring 33 in the endless state, it is required that a portion of the metal ring 33 is cut to bring the metal ring 33 into a free state, and a free-state diameter 2Ro is measured in this state.

If the residual stress on the metal ring 33 in the endless state is a compression stress on the outer peripheral surface and a tensile stress on the inner peripheral surface at that time, when the metal ring 33 in the endless state shown in FIG. 10A has been cut at one point A, the residual stress is released as shown in FIG. 10B, whereby the metal ring 33 is deformed so that it is closed, and one of cut ends 33a of the metal ring 33 interferes with an intermediate portion, whereby an accurate free state is not achieved. Therefore, the free-state diameter 2Ro cannot be measured.

In contrast, in the present embodiment, when the residual stress is released as shown in FIG. 10C to cause the metal ring 33 to be deformed, so that it is closed, by cutting the metal ring 33 in the endless state shown in FIG. 10A at two points: points A and B, a pair of cut ends 33a and 33b of the metal ring 33 do not interfere. In this manner, an accurate free-state diameter 2Ro can be measured.

The number of the points, at which the metal ring 33 in the endless state is cut, is not limited to two and may be three or more. In other words, if the interference occurs when the metal ring 33 in the endless state has been first cut at two points, the metal ring may be cut any number of times, until the interference does not occur.

Although the embodiment of the present invention has been described in detail, it will be understood that the present invention is not limited to the above-described embodiment, and various modifications in design may be made without departing from the spirit and scope of the invention defined in claims.

What is claimed is:

1. A method for measuring a free-state diameter of each one of a plurality of metal rings of a metal belt for a continuously variable transmission by cutting the metal ring, the free-state diameter of the metal ring being determined so that a predetermined compression stress and a predetermined tensile stress are applied to an outer peripheral surface and an inner peripheral surface of the metal ring in an endless state, respectively, comprising the steps of:

cutting said each metal ring at least at two points so that cut ends formed upon cutting of the metal ring do not interfere with each other in a free state; and measuring a free-state diameter of the metal ring.

* * * * *